June 15, 1926.
B. P. HANSON
MOTOR VEHICLE BUMPER
Filed March 29, 1926
1,588,961
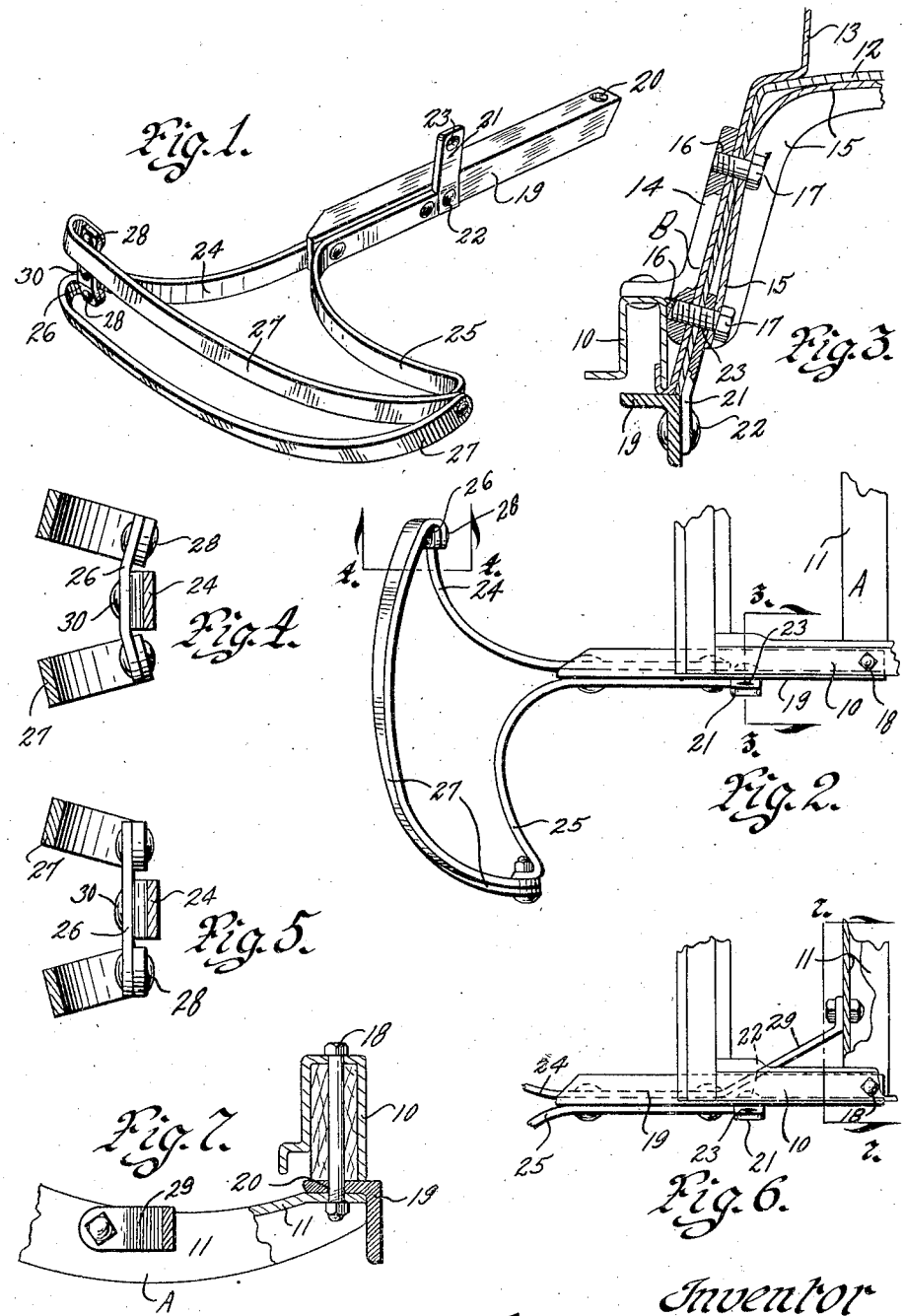

Patented June 15, 1926.

1,588,961

UNITED STATES PATENT OFFICE.

BENNIE P. HANSON, OF CEDAR FALLS, IOWA, ASSIGNOR TO EDWARD L. MOORE, OF WATERLOO, IOWA.

MOTOR-VEHICLE BUMPER.

Application filed March 29, 1926. Serial No. 98,192.

The object of my invention is to provide a bumper for motor vehicles or the like of simple, durable and comparatively inexpensive construction.

More particularly it is my object to provide a bumper having rigid supporting means whereby the bumper proper may be secured to the vehicle frame employing the standard parts of the vehicle frame itself to fasten my bumper thereto.

Still a further object is to provide a support adapted to extend underneath the longitudinal side of the motor vehicle frame and projecting rearwardly therebeyond for having bumper elements secured thereto, the fastenings for the support employing certain standard parts provided on the motor vehicle frame.

Still a further object is to provide a fastening for the bumper support at its rear end using one of the frame bolts therefor and to provide an upstanding lug or standard which rests against the outer side of the frame, between the frame and a brace for the fenders of the vehicle for positioning the bumper support relative thereto and at the same time serves as a means whereby the bumper support may be fastened between its ends to the side bar of the frame.

Still a further object is to provide a pair of bumper elements at one end rigidly fastened together in spaced relation and the other ends of which are fastened together in overlapping relation.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1, is a perspective view of my improved motor vehicle bumper.

Figure 2, is a top plan view showing the connection thereof with the frame of a motor vehicle.

Figure 3, is a detail sectional view showing one of the fastenings whereby the bumper support is connected to the vehicle frame at the connection between the frame and the brace for the fenders of the vehicle.

Figure 4, is a detail sectional view taken on line 4—4 of Figure 2.

Figure 5, is a similar sectional view of a slightly modified form of construction.

Figure 6, is a plan view of the portion of the vehicle frame with my bumper support attached thereto; and Figure 7, is a sectional view taken on line 7—7 of Figure 6.

In the accompanying drawings I have used the reference character A to indicate generally a motor vehicle frame which may include a longitudinal side bar 10 and cross bar 11.

The cross bar 11 has its ends engaged with the side bar 10 and the side bar 10 has its ends projecting beyond or rearwardly of the cross bar 11.

The body of the motor vehicle or automobile is mounted upon the frame A and I have shown in Figure 3 a detail sectional view of parts of the body B. The parts of the body B include a fender 12 which extends over the wheels of the automobile and 13 indicates the body proper.

The fenders 12 rest against the body 13 and are secured and braced relative thereto by an inner body frame 14 and an outer brace member 15. The inner body frame 14 may be fastened to the frame A in any suitable manner and is formed with screw threaded openings 16 for receiving bolts 17.

The bolts 17 are designed to extend through the fender brace 15, through the apron of the fender 12, body 13 and into the screw threaded openings 16.

From the construction of the parts just described it will be noted that the brace 15 is rigidly connected to the body frame 14 and thereby supports the fenders 12.

The cross bar 11 is secured to the side bar 10 by a bolt 18. The parts just described are of standard construction found upon certain types of automobiles and my improved bumper fastening takes advantage of the standard construction of the motor vehicle itself.

My bumper includes a bumper stem or support 19 which may be angular in cross section or formed of any other type of bars.

The forward or inner end of the bumper stem or support 19 is formed with an opening 20 adapted to have the bolt 18 extend therethrough.

The support 19 is positioned between the end of the cross bar 11 and the under side of the side bar 10. In the installation of the support 19 it is necessary to remove the ordinary bolt 18 and slip one flange of the angle support 19 in upon the end of the cross bar 11 so that the opening therein is in register with the openings in the cross bar 11 and side bar 10, for the reception of the bolt 18.

The bolt 18 thereby rigidly connects the side bar 10, cross bar 11 and the inner end of the bumper support together.

The bumper support extends rearwardly along the outside of the side bar 10. Substantially near the rear end of the side bar 10 and fastened to the support 19, is an upturned standard or lug 21 which may be bolted or riveted or otherwise fastened to the support 19.

In the drawings I have shown the lug 21 as fastened to the support 19 by a rivet 22. The upstanding lug 21 is inclined outwardly a slight distance in order that it may be received between the fender apron and the fender brace 15 as clearly shown in Figure 3 of the drawings.

It may be here mentioned that the upturned standard 21 may be offset or otherwise bent, to permit its being fastened between the brace 15 and fender apron 12.

The portion of the lug 21 which projects up above the support 19 is formed with an opening 23 which registers with the openings which receive the bolt 17.

The lug 21 serves as an additional means whereby the support is anchored to the motor vehicle and insures proper positioning of the bumper support relative to the side bar itself.

The rear end of the bumper stem has fixed to it diverging bumper arms 24 and 25. Either the bumper arm 24 or the bumper arm 25 may be formed integral with the support 19 or both of them may be formed integral with the support 19 or the arms 24 and 25 may be of a single piece of material fastened to the bumper support 19.

In the drawings I have shown as secured to the end of the bumper arm 24 a vertical fitting 26 which has ends projecting above and below the arm 24.

A pair of bumper elements 27 are fastened to the vertical fitting 26 on its ends which project above and below the arm 24 by rivets or the like 28.

The two bumper elements 27 converge toward their free ends and overlap each other and are connected to the free end of the bumper arm 25 as clearly shown in Figure 1 of the drawings.

In Figure 4 of the drawings I have shown the fitting 26 as having its ends slightly inclined while in Figure 5 I have shown the fitting 26 as simply straight up and down and the angle of the bumper elements in this case is taken care of by simply twisting the extreme ends of the bumper elements 27 which fasten to the fitting 26.

An additional brace 29 may be employed for giving additional anchorage to the support 19. The brace 29 is fastened to the support 19 and extends at an angle inwardly therefrom and may be fastened to the cross bar 11.

The fitting 26 is secured to the end of the bumper arm 24 by means of fastenings 30 which may be either formed of rivets or bolts.

In the practical installation of my bumper all that is necessary is to disconnect the bolt 18 and insert the inner end of the bumper stem in position.

The lower bolt 17 is removed and the lug 21 projected in between the fender brace 15 and the apron 12 and thereafter the bolt 17 is again extended into its normal openings and the opening 23 formed in the lug 21.

When the bolts 17 and 18 are screwed into proper position after the installation of the bumper stem, then a rigid support for the bumper is provided.

Some changes may be made in the construction and arrangement of the various parts of my invention, without departing from the real spirit and purpose of my invention, and it is my intention to cover by my claims, any modified forms of structure or use of mechanical equivalents which may be reasonably included within their scope.

I claim as my invention:

1. In combination with a vehicle frame having a side bar and a cross bar terminally placed thereacross spaced from one end thereof, of a bumper support mounted longitudinally along the side bar, means for separately fastening said bumper support, side bar and cross bar rigidly together at the inner end of the bumper support, an upstanding lug on the support for securing the other part of the support to the vehicle frame, said bumper support having projecting parts beyond the end of said side bar and a pair of transversely arranged resilient bumper elements secured to said projecting parts.

2. In combination with a vehicle frame having a side bar and a cross bar terminally placed thereacross spaced from one end thereof, of a bumper support mounted longitudinally along the side bar, means for separably fastening said bumper support, side bar and cross bar rigidly together at the inner end of the bumper support, other means for securing the other part of the support to the vehicle frame and a pair of transversely arranged resilient bumper bars secured upon the free end of said bumper support.

3. In combination with a vehicle frame having a side bar and a cross bar terminally placed thereacross spaced from one end thereof, of a bumper support mounted longitudinally along the side bar, means for separably fastening said bumper support, side bar and cross bar rigidly together, at the inner end of the bumper support, other means for securing the other part of the support to the vehicle frame, said bumper support having projecting parts beyond the end of said side bar and a pair of transversely arranged resilient bumper elements secured upon the free ends of said projecting parts.

4. In combination with a vehicle frame a side bar and a cross bar terminally placed thereacross spaced from one end thereof, of a bumper support mounted longitudinally along the side bar, said side bar, cross bar and bumper support having aligned bolt holes, a bolt traversing said bolt holes to fasten said elements together, a standard having an opening therein fixed to said bumper support between its ends and projecting up above said support whereby said support may be rigidly connected to said vehicle frame at a point spaced from said bolt hole, means for connecting bumper elements to said bumper support having portions extending transversely thereof and a pair of spaced transverse bumper elements having their ends connected to the ends of said means.

5. In combination with a vehicle frame a side bar and a cross bar terminally placed thereacross spaced from one end thereof, of a bumper support mounted longitudinally along the side bar, said side bar, cross bar and bumper support having aligned bolt holes, a bolt traversing said bolt holes to fasten said elements together, a standard having an opening therein fixed to said bumper support between its ends and projecting up above said vehicle frame at a point spaced from said bolt hole, means for connecting bumper elements to said bumper support having portions extending transversely thereof and a pair of spaced transverse bumper elements having one of their ends rigidly fixed to one of said portions and having their other ends pivotally connected together.

6. In combination with a vehicle frame, of a bumper support removably fastened thereupon to project rearwardly therefrom, means for connecting bumper elements to the rear end of said support having portions projecting on opposite sides therefrom a vertical fitting rigidly fixed on one portion of said means, a pair of bumper elements fastened to said fitting above and below the means and fastened at their other ends to the other portion of said means.

7. The combination of a vehicle frame, a fender, a brace mounted on the frame for supporting the fender relative to the frame and means for connecting the brace to the frame, with a bumper support fastened at its inner end to the frame, an upstanding lug on the support connected with said brace by said connecting means for additionally fastening the support on the frame and a bumper device mounted on said support.

8. In combination with a vehicle frame, of a bumper support fastened at its inner end to the frame, an upstanding lug on said support for additionally fastening the support to the frame, means for securing bumper elements to the rear end of said support having portions projecting on opposite sides therefrom, a vertical fitting rigidly fixed on one of said portions projecting above and below said last portion, a pair of bumper elements rigidly fastened at one end to said fitting and a single bolt for connecting the other ends of said bumper elements to the other of said portions.

9. In combination with a vehicle frame, of a bumper support fastened at its inner end to the frame, an upstanding lug on said support for additionally fastening the support to the frame, means for connecting bumper elements to the rear end of said support having portions projecting on opposite sides therefrom, a vertical fitting rigidly fixed on said means and projecting above and below said means, a pair of bumper elements rigidly fastened to said fitting, the free ends of said bumper elements being inclined towards each other and fastened to said means.

10. In combination with the side bar of a vehicle frame a bumper comprising a pair of arms, common means for fastening said arms to the side bar, said arms diverging from said side bar, a vertical fitting rigidly fixed on one of said arms and projecting above and below the same, a pair of bumper elements having one end rigidly fastened to said fitting, and a single bolt for connecting the other ends of said bumper elements to the other of said arms.

BENNIE P. HANSON.